UNITED STATES PATENT OFFICE.

GLEN LENARDO WILLIAMS, OF NEW YORK, N. Y., ASSIGNOR, BY MESNE ASSIGNMENTS, TO HENRY WALTON CAMPBELL, OF DETROIT, MICHIGAN.

PROCESS OF MAKING AMMONIA FROM COMPOUND NITRIDS.

1,379,668.    Specification of Letters Patent.    Patented May 31, 1921.

No Drawing.    Application filed June 26, 1918.    Serial No. 241,959.

*To all whom it may concern:*

Be it known that I, GLEN LENARDO WILLIAMS, a citizen of the United States, residing in New York city, in the county of New York, State of New York, have invented certain new and useful Improvements in Processes of Making Ammonia from Compound Nitrids, of which the following is a specification.

This invention relates to the production or producing and securing of ammonia from compounds containing aluminum, silicon and nitrogen, such as compound aluminum and silicon nitrid by the action of hydrogen, either *per se* or delivered from a substance capable of yielding the same, and has for its object the production of ammonia from its nitrogen-containing compounds in shorter time with greater facility and purer product at less cost than has been secured hitherto, together with yielding of by-products having commercial value, such as aluminum silicid and it comprises exposing a compound aluminum and silicon nitrogen compound, such as aluminum silicon nitrid to the action of hydrogen and heat, preferably under pressure and securing the ammonia yielded and the aluminum separated as hereinafter more fully set fourth.

In carrying out the invention, the production of ammonia from compound aluminum and silicon nitrid by the action of hydrogen and heat will be taken, preferably while under super-atmospheric pressure.

As a specific example of the process, compound aluminum and silicon nitrid is placed in a suitable receptacle and heated to redness at which time hydrogen gas is pumped into the apparatus in contact with the compound aluminum and silicon nitrid until a pressure of approximately 200 lbs. is reached at which time it or its products are allowed to escape through a relief valve adjusted to open at such pressure, whence the ammonia product and gaseous uncombined nitrogen are conveyed to an absorbing receptacle or reservoir. The hydrogen comes in contact with the compound aluminum and silicon nitrid under pressure in a heated state, and it gradually combines with the nitrogen to produce ammonia gas which passes off leaving aluminum and silicon or aluminum silicid behind, which may be afterward melted together in a mass, provided the temperature is maintained above that necessary to melt the aluminum containing silicon product, or it may be tapped off from time to time as it accumulates, provided the temperature is maintained above the melting point during the reduction process, in which latter case, the process may be carried on continuously by supplying compound aluminum and silicon nitrid and hydrogen to the apparatus from time to time and withdrawing the aluminum silicid yielded as it accumulates. The ammonia produced at the same time the aluminum silicid is yielded is conveyed to absorbing towers or apparatus of the usual form for producing ammonium hydrate or hydroxid, chlorid, sulfate or other compound in a manner usually employed for the recovery of ammonia from ordinary gas as produced in gas works and other operations.

The hydrogen employed may be produced in any desired manner, such as the decomposition of water by heated iron or by electrolysis of water. The hydrogen may be supplied from a reservoir containing the same under a pressure superior to that at which the relief valve discharging from the apparatus is set, which is approximately 200 lbs. or the hydrogen may be obtained from any suitable source and supplied by means of a suitable pumping device.

The compound aluminum and silicon nitrid may be produced in any suitable way. Any silicon hydrid (silico-methane $SiH_4$) which may also be produced if the temperature should soar may be easily separated from the ammonia (nitrogen hydrid $NH_3$) by the absorbing or combining substance employed, such as water or acid, to secure said ammonia. The silicon hydrid being inert thereto is thus freed therefrom and passes off.

It is found that compound aluminum and silicon nitrid may be reduced or denitrogenized by hydrogen and heat in the formation of ammonia and yielding of aluminum silicid under ordinary atmospheric pressure. It is preferable however for commercial purposes to carry on this reaction under super-atmospheric pressure which produces a larger yield in shorter time of ammonia and aluminum silicid by reason of the hydrogen gas being compressed and therefore present in larger amounts available for reaction.

The compound aluminum and silicon nitrid during its denitrogenation may be heated in any convenient manner, either from heat derived from the exterior through the containing retort or receptacle walls or heated internally through electrical resistance so long as the reaction is maintained at a temperature selective to the larger yield in shorter time with the ingredients employed, which is controlled and maintained in accordance with the character of the gaseous products or by-products discharged from the relief valve which by chemical analysis or test from time to time will determine the percentage of ammonia formed and hydrogen consumed from which the advisability of raising or lowering the temperature or increasing the pressure will be indicated.

The character of the compound aluminum and silicon nitrid employed with reference to its denitrogenation by hydrogen produces a reaction of more or less activity according to the manner in which the nitrid has been produced. If the nitrid is porous it is readily permeated by the hydrogen or if it is of more vitreous nature like that which has been produced at elevated temperatures the regulation of the temperature and pressure under which the reaction is carried out to its best or more perfect conversion must be ascertained and corrected in accordance with the character of the gaseous by-products produced.

Good results have been obtained by heating in the presence of hydrogen, compound aluminum and silicon nitrid of porous and permeable character, like that which is produced by the action of nitrogen and a heated mixture of aluminum silicate and carbon in excess, employing ordinary air as a source of nitrogen, and heating the ingredients, while under a pressure of 200 lbs. by internal combustion of the carbon by the oxygen of the air employed as hereinbefore noted, to a temperature of above 500 to 600 degrees C.

The speed or velocity of the hydrogen at a temperature of 500 degrees centigrade and pressure of 200 lbs. should be such that the larger part of it is consumed in the formation of ammonia and aluminum silicid as determined by the character of the gaseous products evolved and regulated in its supply accordingly.

It is obvious that as compound aluminum and silicon nitrid is denitrogenized and aluminum silicid yielded that the amount of ammonia formed will gradually diminish, and this or aluminum silicon containing yield is also indicated by the character of gaseous products evolved which can easily be determined by passing some of the gas into a graduated glass tube, shutting off the same and introducing water which absorbs the ammonia and indicates the percentage contained therein.

During the formation of ammonia and the yield of aluminum silicid by the action of hydrogen on aluminum silicon nitrid, large volumes of hydrogen are absorbed and condensed, therefore it is necessary to continuously pump in hydrogen rapidly in order to attain a pressure sufficient to open the relief valve and discharge the gaseous products from the apparatus.

The reduction or denitrogenizing of compound aluminum and silicon nitrid by the action of hydrogen in the yielding of aluminum silicid and forming of ammonia may be facilitated by the action of certain contact and catalytic substances inert to aluminum silicid, such as charcoal which augments the condensation of hydrogen and retains it in contact with the nitrid in a condition best adapted for its union with nitrogen in the formation of ammonia and the liberation of aluminum silicid. Instead of finely divided carbon, such as charcoal, any other inert substance capable of augmenting the transformation and yielding of the aluminum silicid may be employed, such as magnesium oxid, without departing from the spirit of the invention.

Having now described my invention what I claim is:—

1. The process of producing ammonia which comprises exposing compound aluminum and silicon nitrid to the action of hydrogen at a reacting temperature and in equivalent proportion to yield aluminum and silicon.

2. The process of producing ammonia which comprises exposing compound aluminum and silicon nitrid to the action of hydrogen under super-atmospheric pressure at a reacting temperature and in equivalent proportion to yield aluminum and silicon.

3. The process of producing ammonia which comprises exposing compound aluminum and silicon nitrid to the action of hydrogen in equivalent proportion to yield aluminum and silicon and heat.

4. The process of producing ammonia which comprises exposing compound aluminum and silicon nitrid to the action of hydrogen in equivalent proportion to yield aluminum and silicon under super-atmospheric pressure and heat.

5. The process of producing ammonia which comprises heating compound aluminum and silicon nitrid and exposing it to the action of flowing hydrogen in equivalent proportion to yield aluminum and silicon.

6. The process of producing ammonia which comprises heating compound aluminum and silicon nitrid and exposing it to the action of flowing hydrogen in equivalent proportion to yield aluminum and silicon under super-atmospheric pressure.

7. The process of producing ammonia, which comprises exposing compound aluminum and silicon nitrid to the action of hydrogen and a contact substance at a reacting temperature.

8. The process of producing ammonia which comprises exposing compound aluminum and silicon nitrid to the action of hydrogen under super-atmospheric pressure and a contact substance and at a reaction temperature.

9. The process of producing ammonia which comprises exposing compound aluminum and silicon nitrid to the action of hydrogen, heat and a contact substance.

10. The process of producing ammonia which comprises exposing compound aluminum and silicon nitrid to the action of hydrogen under super-atmospheric pressure, and heat in the presence of a contact substance.

11. The process of producing ammonia which comprises heating compound aluminum and silicon nitrid and exposing it to the action of flowing hydrogen and a contact substance.

12. The process of producing ammonia which comprises heating compound aluminum and silicon nitrid and exposing it to the action of flowing hydrogen under super-atmospheric pressure and in the presence of a contact substance.

13. The process of producing ammonia which comprises exposing compound aluminum and silicon nitrid to the action of hydrogen and a magnesium compound at a reacting temperature.

14. The process of producing ammonia which comprises exposing compound aluminum and silicon nitrid to the action of hydrogen under super-atmospheric pressure and a magnesium compound at a reacting temperature.

15. The process of producing ammonia which comprises exposing compound aluminum and silicon nitrid to the action of hydrogen, heat and a magnesium compound.

16. The process of producing ammonia which comprises exposing compound aluminum and silicon nitrid to the action of hydrogen under super-atmospheric pressure, heat and a magnesium compound.

17. The process of producing ammonia which comprises heating compound aluminum and silicon nitrid and exposing it to the action of flowing hydrogen and a magnesium compound.

18. The process of producing ammonia which comprises heating compound aluminum and silicon nitrid and exposing it to the action of flowing hydrogen under super-atmospheric pressure and a magnesium compound.

In testimony whereof I affix my signature in the presence of two witnesses.

GLEN LENARDO WILLIAMS.

Witnesses:
PAUL R. NEWMAN,
ERNEST H. BALL.